Dec. 12, 1944.  E. C. HORTON ET AL  2,364,715
FLUID MOTOR
Original Filed July 27, 1940  3 Sheets-Sheet 1
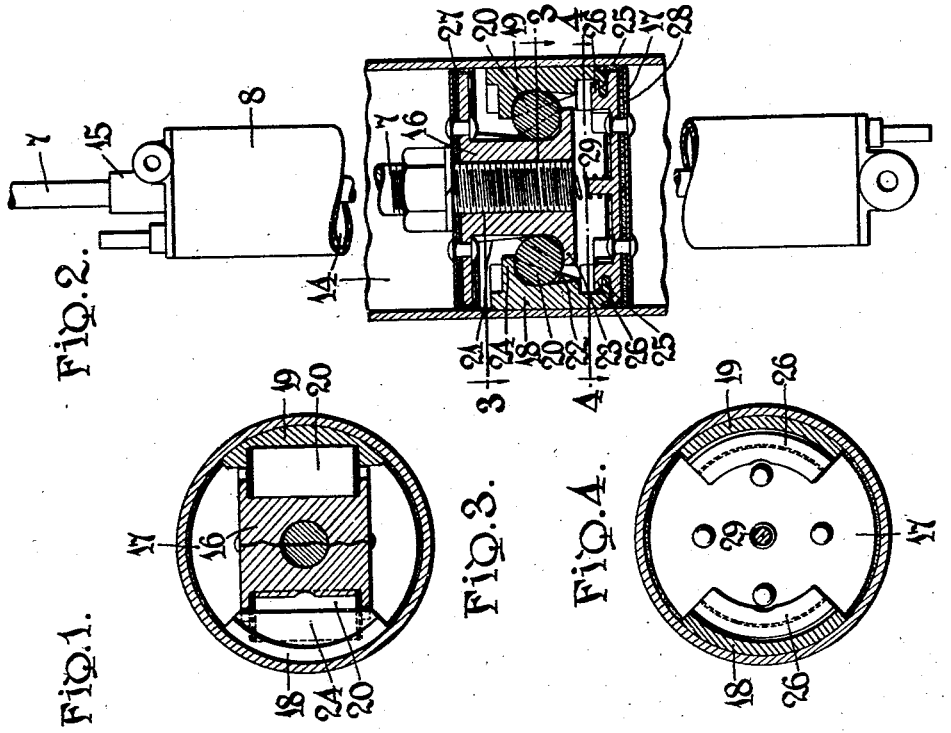
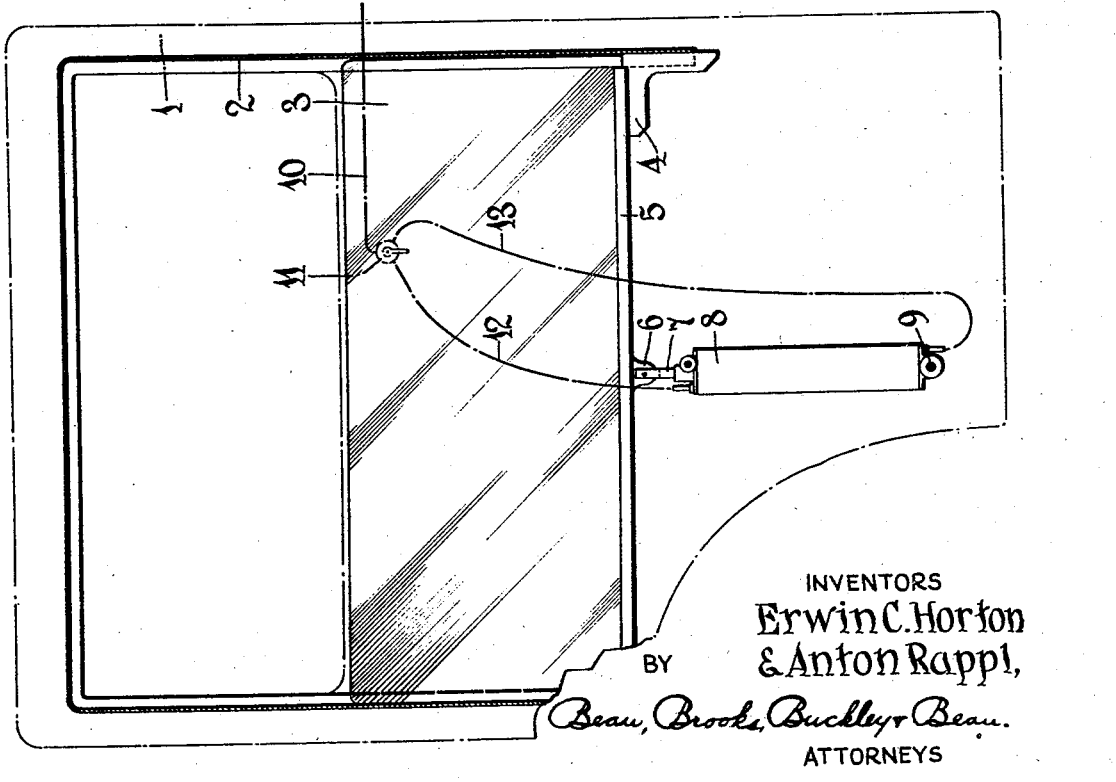
INVENTORS
Erwin C. Horton
& Anton Rappl,
BY
Beau, Brooks, Buckley & Beau.
ATTORNEYS Dec. 12, 1944.     E. C. HORTON ET AL     2,364,715
FLUID MOTOR
Original Filed July 27, 1940     3 Sheets-Sheet 2

INVENTORS
Erwin C. Horton
& Anton Rappl,
BY
Beau, Brooks, Buckley & Beau.
ATTORNEYS

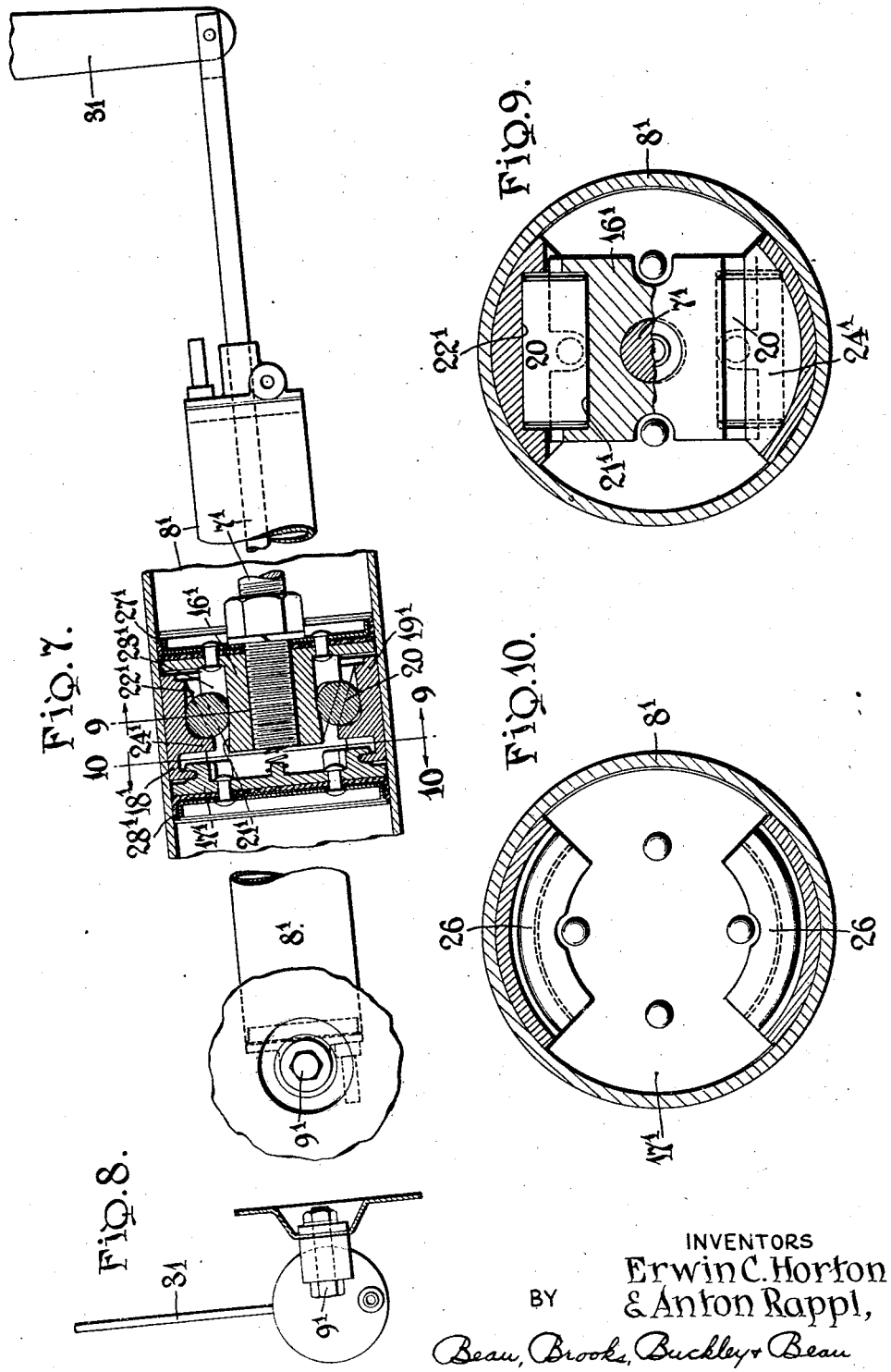

Patented Dec. 12, 1944

2,364,715

UNITED STATES PATENT OFFICE 2,364,715

FLUID MOTOR

Erwin C. Horton, Hamburg, and Anton Rappl, Buffalo, N. Y., assignors to Trico Products Corporation, Buffalo, N. Y.

Original application July 27, 1940, Serial No. 347,941. Divided and this application November 14, 1941, Serial No. 419,139

13 Claims. (Cl. 121—40)

This invention, which is a division of application Serial No. 347,941, filed July 27, 1940, relates to a fluid motor and has particular reference to a self-locking motor which finds use in varied fields wherein it is desired, while the motor is at rest, to hold or support its connected mechanism or part in a given position or location against yielding to an extraneous force tending toward its displacement.

The primary object of the invention is to provide a self-locking motor of this type which is efficient in operation and of simple and practical construction.

The invention further resides in a fluid motor having a chamber and a relatively movable wall therein embodying means which become increasingly more effective to resist such relative movement when the movable element is urged from and by an extraneous force of increasing magnitude.

In the drawings:

Fig. 1 is an elevation of the motor showing a practical application of the same;

Fig. 2 is a fragmentary view of the fluid motor, part in elevation and part in section with the sectional part enlarged for the sake of clearness;

Figure 5:
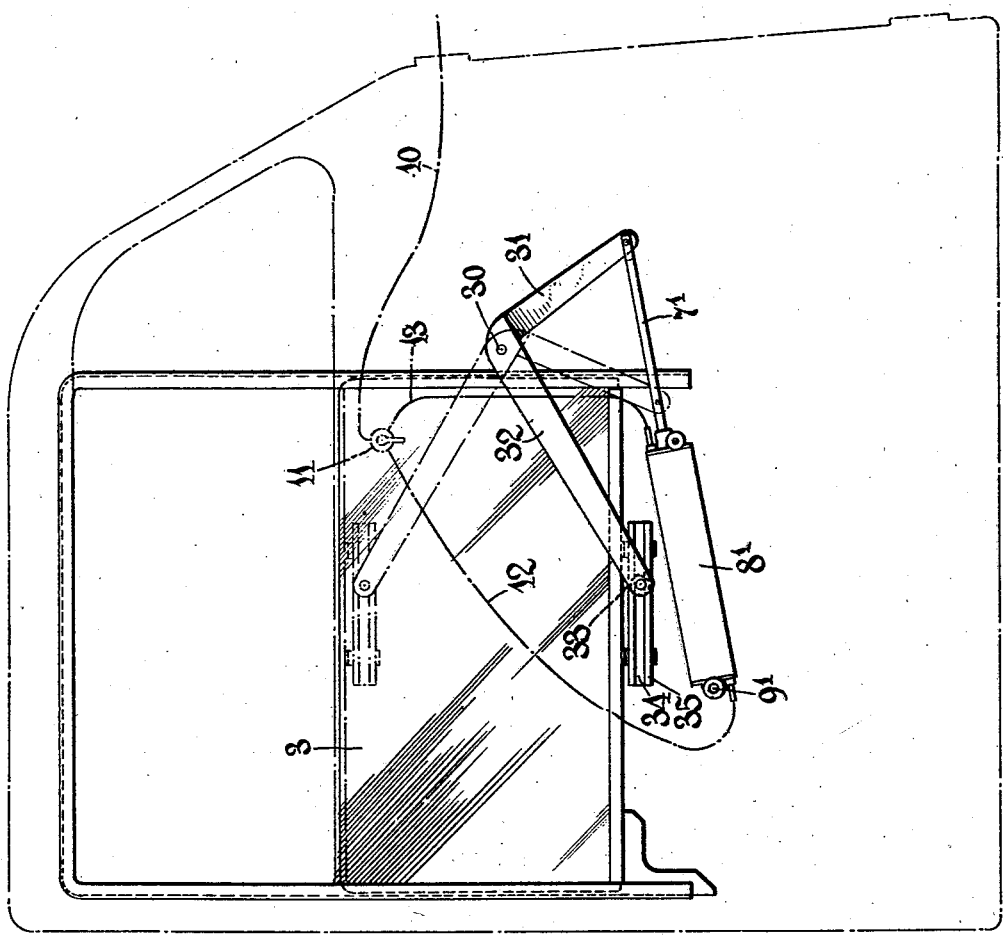
Figure 6:
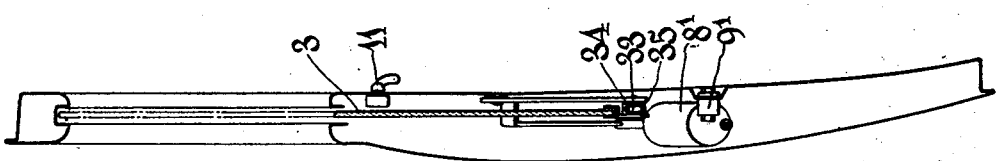

Figs. 3 and 4 are cross sectional views taken about on lines 3—3 and 4—4, respectively, of Fig. 2;

Fig. 5 is a view similar to Fig. 1 depicting a modified arrangement;

Fig. 6 is a vertical sectional view through the motor vehicle door of Fig. 5 showing more clearly the mounting of the fluid motor;

Fig. 7 is a view similar to Fig. 2 of the modified arrangement illustrated in Figs. 5 and 6;

Fig. 8 is an elevation of the pivotally mounted end of the fluid motor; and

Figs. 9 and 10 are cross sectional views taken about on lines 9—9 and 10—10, respectively, of Fig. 7.

Referring more particularly to the drawings which show, by way of example, the motor of the present invention being utilized to operate a window of a motor vehicle, the numeral 1 designates, in phantom, the door of an automobile such as the rear door of a four door sedan, having a guide-way 2 receiving the vertically slidable window pane 3, the lowering movement of which is suitably restricted by a stop 4. The glass panel is provided with the usual border strip 5 which has an ear 6 connected to the piston rod 7 of an air motor 8, the casing of which, in turn, is mounted at 9 on the door structure. The motor is connected to a suitable source of fluid pressure or suction, such as the intake manifold of the motor vehicle engine, by a conduit 10 (indicated by the broken lines in Fig. 1), a control valve 11, and branch conduits 12 and 13, the two branches communicating with the respective ends of the motor chamber 14. The piston rod 7 is guided through a stuffing box 15 at one end of the motor chamber which is illustrated in the form of a cylinder.

In accordance with the present invention, clutch or brake means are carried by the piston for locking the motor elements against relative movement. As shown in Fig. 2, the piston embodies a rod carried section 16, fixed relative to the piston rod 7, and a floating section 17, the latter section being connected to the expassible clutch or brake including the shoes 18 and 19 which are adapted to be expanded as against the inner wall of the cylindrical motor chamber 14 to thereby frictionally lock the piston against movement. This action is accomplished herein by one or more rollers 20 which are ridingly interposed between opposing cam surfaces 21 and 22 provided, respectively, on the piston sections 16 and 17. For this purpose the body portion of the fixed or rod carried piston section 16 extends axially of the cylinder between the shoes 18 and 19. The cam surfaces of each pair terminate at their lower ends in abutments 23 and 24, respectively, which cooperate with the interposed roller to connect mechanically the floating section 17 to the fixed section 16 for relative movement. The shoes 18 and 19 are movably connected by the interlocking ribs 25 and 26 to the main body portion of the floating section for expansive action in which the shoe-carried rib 25 slides radially in and out beneath the overhanging rib 26 on the main body portion.

The control valve 11 is designed to connect one end of the motor chamber 14 to the source of suction and simultaneously open the opposite end to the atmosphere, and vice-versa, so as to create a pressure differential on the fabricated piston. Therefore, if the suction is applied to the upper side of the piston as shown in Fig. 2 and the lower side of the piston is open to the atmosphere, it is apparent that the pressure differential will act upon the fixed piston section 16, the cup leather packings 27 and 28 being turned inwardly toward one another so that the atmospheric pressure will slip by the lower packing and act primarily on the upper section 16 in cooperation with the suction. Consequently, the upper piston section 16 will move upwardly to lift the window toward its closed position, and during this movement the floating section will drag by reason of its frictional fit and contact with the chamber wall. Thus, the piston sections will relatively move apart and the rollers 20 will roll downwardly against the abutment 23 and become engaged by the floating abutment 24 to constitute a driving connecting link between the two piston sections. The floating section 17 will be pulled along by the driving or active piston section 16 while the rollers idly rest between the opposing low ends of the respective cam surfaces 21 and 22 and the retracted shoes freely slide along the cylinder wall. A small coil spring 29 may be interposed between the two piston sections to urge them toward a lock applying position for minimizing any play between the sections.

To lower the window the suction is applied to the lower side of the piston and the atmosphere is directed to the upper side whereby the floating piston section 17 becomes the active section to pull the piston downwardly while the fixed section idles along.

Any attempt to open the window from a closed or partially closed position will result in such downward effort being transmitted by the glass panel 3 through the piston rod 7 to the rod carried section 16, causing the latter to move relative to the friction held floating section 17 and between the rollers to move the latter up the cam faces 21 and 22 and thereby expand the shoes outwardly against the chamber wall. This expansive action of the brake or shoes will hold such floating piston section against any movement whatsoever. In other words, any effort to push the piston will be resisted while any pulling effort, such as that produced by the fluid pressure differential, will succeed in moving the entire piston assembly.

Where a motion transmitting linkage is interposed between the motor and the window glass a slightly different arrangement of the piston parts is necessitated and this has been illustrated in the modified showing of Figs. 5 through 10 wherein the motor 8' is given pivotal support on the anchorage 9' and the piston rod 7' is connected to the power transmitting linkage. This linkage comprises a bell crank pivotally supported at 30 and having one arm 31 pivotally connected to the piston rod and the companion arm 32 slidably connected to the glass panel by its roller 33 operating in a guideway 34 of the track 35 on the panel 3.

Referring more particularly to Fig. 7, the fixed piston section 16' and the floating piston section 17' have their abutments 23' and 24' disposed in reverse order to the arrangement shown in Fig. 2, the shoe-carried abutments 24' being arranged closer to the shoe mountings and facing in the opposite direction while the abutments 23' are arranged on the opposite side of the abutments 24' and in opposition thereto. Also, the cam surfaces 21' and 22' rise in opposite directions from the abutments. Furthermore, the cup packing members 27' and 28' face outwardly away from each other so that the pressure differential acting on one piston section will serve to push the companion piston section ahead of it, rather than pull it in the manner earlier described herein. Therefore, if suction is applied to the left-hand end of the motor chamber, as shown in Figs. 5 and 7, and the right-hand end is opened to the atmosphere, the pressure differential will act on the fixed piston section 16' and push it toward the left, pulling on the bell crank 31, 32, and effect a lifting of the window pane 3. A reversal of the fluid connections will cause the pressure differential to act on the floating piston section 17' to push the fixed section 16' and rock the arm 32 downwardly for opening the window.

Any attempt to pry the window open from a closed position or from a partially opened position will cause such effort to be transmitted by the bell crank lever to the motor piston and subject the fixed piston section 16' to a pull which will force the rollers up the cam surfaces 21' and 22' and thereby expand the shoes 18' and 19' outwardly against the chamber wall to frictionally lock the piston against sliding.

It will be observed that the improved motor is capable of operating efficiently by fluid pressure for performing work other than the opening and closing of windows. The construction incorporates means which will prevent the work being moved in a specific direction away from the position in which the motor left it at the time the fluid actuated movement of the motor ceased. It will also be noted that such locking means does not in any way interfere with the functioning of the motor operation by the fluid pressure.

The foregoing constructions have been described in detail for clarity and to illustrate the inventive principles involved, the latter being capable of assuming other physical embodiments without departing from the spirit or scope of the appended claims.

What is claimed is:

1. A piston for fluid motors of the class described, comprising spaced sections, one free and the other connected to a rod and each section carrying a cup packing member so positioned that fluid may flow past its edges in one direction and not in the reverse direction whereby to adapt one section for operation by a fluid pressure differential in one direction and to adapt the companion section for like operation in the opposite direction, said free section being substantially discoidal in form, a shoe carried by the free section for radial movement and serving to provide operative support for the free section, and means connecting the shoe to the connected section for moving the shoe outwardly upon rod imparted movement of the connected section, said free section having an outwardly extending rib and said shoe having an inwardly extending rib, the two ribs extending transversely of the path of piston movement and interengaging one another for slidably and detachably mounting the shoe on the free section.

2. A fluid motor comprising a chamber, a piston relatively slidable therein, a power transmitting member, said piston comprising relatively movable sections, one connected to the member and the other free and each having sliding contact with the chamber wall and being adapted for fluid operation independently of the companion section, the free section having an outwardly facing recess, means for locking the piston immovable relative to the chamber, said locking means having a chamber engaging element with a projection movably interlocking in the recess and held so engaged by the chamber wall, means resiliently pressing the element into engagement with the chamber wall, and means interposed between the chamber engaging element and the member connected section for sliding the element on the free section, the element and the member connected section having parts overhanging said interposed means to operatively confine the latter and constitute therewith a coupling between the sections.

3. A fluid motor comprising a chamber, a piston relatively slidable therein, a power transmitting member, said piston comprising relatively movable sections each fluid actuated independently of the other, said member operatively connected to one section, the companion section being free and spaced from said one section and said member, expansible locking means interposed between the sections and acting to support said companion section operative, said locking means including an element connecting parts on the two sections in a manner to expand portions of said locking means operatively by and during a member imparted movement of said one section and to render said locking means ineffective by and during fluid imparted movement of one of said sections, the companion section having outwardly facing arcuate ribs by which the expansible locking means is guidingly connected thereto to one side of the plane of operation of said element.

4. A piston for fluid motors of the class described, comprising spaced sections, one free and the other adapted for connection to a rod and each section carrying a cup packing member so positioned that fluid may flow past its edges in one direction and not in the reverse direction whereby to adapt one section for operation by a fluid pressure differential in one direction and to adapt the companion section for like operation in the opposite direction, brake means mechanically coupling the two sections, said brake means operable by said rod connected section upon rod imparted movement thereof to expand radially for resisting piston movement, and resilient means interposed between the piston sections for urging them apart and thereby tending to hold the brake means inoperative.

5. A fluid motor comprising a chamber, a piston relatively slidable therein, a power transmitting member operatively connected to the piston, said piston comprising relatively movable sections each having a cup packed in sliding contact with the chamber wall and being adapted for fluid operation independently of the companion section, the flanges of the two cup packings extending toward each other whereby fluid may pass each into the intervening space for acting on the other, means for locking the piston immovable relative to the chamber, said locking means having a chamber engaging element, and means responsive to the fluid movement of either section for withdrawing the element from a chamber engaging position.

6. A fluid motor comprising a chamber, a piston therein having relatively movable sections each adapted for being fluid actuated but in a direction opposite to the direction of movement of the companion section, a member connected to one section to transmit power from and to the piston, the companion section being free and spaced from said one section, arcuate shoes interposed between the sections and having means on one margin slidably connecting the shoes to the companion section, said one section having a part extending between the shoes, a power transmitting element between each shoe and said part operating upon member imparted movement of said one section to expand its shoe into locking contact with fixed abutments on the opposite margin of the shoes and said section part, said abutments overhanging said element for confining the latter and acting therewith to couple the sections together.

7. A fluid motor comprising a chamber, a piston relatively slidable therein, a power transmitting member, said piston comprising relatively movable sections each fluid actuated independently of the other, said member operatively connected to one section and having an actuating part, the companion section being free and unsupported by said member, expansible locking means interposed between the sections and including a shoe with a cam face opposing a cooperating cam face on said actuating part, and a power transmitting element interposed between the cam faces and cooperating with the shoe to mechanically couple the two sections together for movement in unison when one is fluid actuated.

8. A fluid motor comprising a chamber, a piston therein having relatively movable sections each adapted for being fluid actuated but in a direction opposite to the direction of movement of the companion section, a rod connected to one section to transmit power from and to the piston, shoes interposed between the sections and engageable with the inner wall of the chamber to lock the piston against movement in the chamber, said one section having a part extending between the shoes, means movably supporting the shoes on the section free of the rod, and means arranged between the shoes and said part for expanding the shoes and acting additionally to connect the sections for movement in unison when either section is fluid actuated.

9. A fluid motor having a casing with a chamber and a piston in the chamber, means for mounting the motor, said mounting means including a connecting member, and said piston comprising spaced relatively movable sections each having fluid seal fit with the chamber wall and one section being fixed to the connecting member while the companion section is floating with respect thereto, a pair of lock shoes interposed between the piston sections and carried by the companion section, said shoes having cam surfaces, said fixed section having cam surfaces opposing the first surfaces, and rolling members riding between the cam surfaces to expand the shoes against a fixed part of the casing upon movement of said fixed section as imparted by the connecting member, said cam surfaces having opposing abutments cooperable with the rolling members to connect the piston sections together whereby to constitute the rolling members as power transmitting elements between the two piston sections during fluid operation of the piston.

10. A fluid motor having a casing with a chamber and a piston in the chamber, said piston comprising spaced relatively movable sections each having fluid seal fit with the chamber wall for fluid actuation independently of and in the opposite direction from the companion section, one section having a piston rod for actuation thereby, the other section floating with respect thereto, a pair of lock shoes interposed between the piston sections and carried by the floating section, said shoes having cam surfaces, said joined section having cam surfaces opposing the first surfaces, and rolling members riding between the cam surfaces to expand the shoes against a fixed part of the casing upon a rod imparted movement of said one section and to release the shoes from said fixed part upon fluid pressure actuation of either piston section.

11. A fluid motor comprising a chamber, a piston slidable therein, a piston rod operatively connected to the piston, said piston comprising relatively movable sections one of which is fixedly related to said rod and comprises a lock actuating part, lock shoes arranged on opposite sides of said part and movably mounted on the other piston section for engagement with a fixed portion of the chamber to lock the piston in the chamber, and a force transmitting member supporting each shoe off from said lock actuating part, said shoe supporting force transmitting members being movable by and cooperating with said actuating part to expand and contract the shoes, and said actuating part and said shoes having abutments overhanging said members to confine the latter in position and also to operatively connect the two piston sections, such members acting in response to a rod imparted movement of said part to render operative the lock shoes and acting in response to a fluid imparted movement of said other piston section to render inoperative said lock shoes.

12. A fluid motor comprising a chamber, a piston slidable therein, a piston rod operatively connected to the piston, said piston comprising relatively movable sections one of which is fixedly related to said rod and comprises a lock actuating part, lock shoes arranged on opposite sides of said part and movably mounted on the other piston section for engagement with a fixed portion of the chamber to lock the piston in the chamber, a force transmitting member supporting each shoe off from said lock actuating part, said shoe supporting force transmitting members being movable by and cooperating with said actuating part to expand and contract the shoes, such members acting in response to a rod imparted movement of said part to render operative the lock shoes and acting in response to a fluid imparted movement of said other piston section to render inoperative said lock shoes, and retaining means on the actuating part and on the shoes interlocking with and operating to hold the shoe supporting force transmitting members in place when the piston is responding to the fluid pressure.

13. A fluid motor comprising a chamber, a piston slidable therein, a piston rod operatively connected to the piston, said piston comprising relatively movable sections one of which is fixedly related to said rod and comprises a lock actuating part, lock shoes arranged on opposite sides of said part and movably mounted on the other piston section for engagement with a fixed portion of the chamber to lock the piston in the chamber, and a force transmitting member supporting each shoe off from said lock actuating part, said shoe supporting force transmitting members being movable by and cooperating with said actuating part to expand and contract the shoes, such members acting in response to a rod imparted movement of said part to render operative the lock shoes and acting in response to a fluid imparted movement of said other piston section to render inoperative said lock shoes, the inner face of each shoe extending substantially chordal of the chamber to provide a wide seat for receiving the force transmitting member, the latter having supporting engagement with the inner face at points on opposite sides of a diametral plane substantially normal to the inner face whereby to provide a stabilized support for the shoe.

ERWIN C. HORTON.
ANTON RAPPL.